United States Patent Office 3,081,150
Patented Mar. 12, 1963

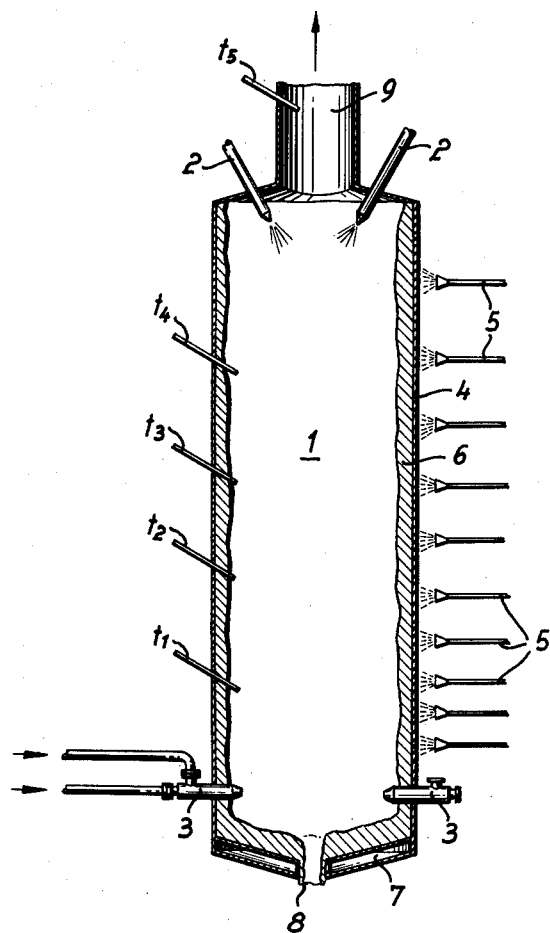

3,081,150
PROCESS FOR THE MANUFACTURE OF CONDENSED ALKALI METAL PHOSPHATES
Klaus Beltz and Franz Rodis, both of Knapsack, near Koln, and Friedrich Thomas, Hurth, near Koln, Germany, assignors to Knapsack-Griesheim Aktiengesellschaft, Knapsack, near Koln, Germany, a corporation of Germany
Filed Jan. 19, 1960, Ser. No. 3,329
Claims priority, application Germany Jan. 22, 1959
3 Claims. (Cl. 23—106)

The invention is concerned with a process and apparatus for the manufacture of condensed alkali metal phosphates from phosphoric acid and alkali metal chloride.

At the present time, condensed alkali metal phosphates are generally prepared from alkali metal orthophosphates by subjecting them to a heat treatment. The alkali metal orthophosphates are usually obtained by neutralizing phosphoric acid with alkali metal hydroxides or alkali metal carbonates. It has also been proposed to prepare condensed alkali metal phosphates without the intermediate formation of orthophosphates by having phosphoric acid act upon alkali metal chlorides at high temperatures. In this case, the neutralization of the phosphoric acid with separation of hydrogen chloride and the condensation of the phosphates with separation of water take place at the same time. In this method of working, there are obtained intermediate products which become glassy solids when cooled and which represent mixtures of polyphosphates of different chain lengths and unreacted alkali metal chloride.

When carrying out the known processes for the manufacture of condensed alkali metal phosphates from phosphoric acid and alkali metal chloride, there are difficulties in so far as the reaction mixture and the final product undergo a reaction with the material of the vessel in which the reaction is carried out. Since the process must be carried out at very high temperatures in order to promote the reaction, the phosphates formed and the abovementioned chloride-containing products are mostly in the state of a molten mass in which state they are extremely reactive so that any known container material is attacked by them. Therefore, the phosphate formed is, in any case, more or less considerably contaminated by constituents of the container material. It has already been proposed to convert alkali metal chlorides into alkali metal phosphate by reacting them with elementary phosphorus and oxygen. The combustion heat of the phosphorus provides the energy which is necessary for the reaction. Thus, for example, there have been described processes according to which finely ground alkali metal chloride is blown into a hot gas current which contains phosphorus pentoxide and is produced by the combustion of phosphorus, or is blown directly into a phosphorus flame. All these processes have the disadvantage that a complete mixing and conversion of the reactants is not obtained. Since the two reactants, alkali metal chloride and phosphorus or phosphorus pentoxide are introduced into the reaction chamber in different ways, and not in a premixed form, an occasional deficiency or excess of one or the other reactant cannot be avoided and it is not possible to obtain homogeneous final products.

The present invention is based on the observation that these difficulties can be overcome and good yields of condensed alkali metal phosphates, which are free from impurities, are obtained from phosphoric acid and alkali metal chloride by preparing a mixture of phosphoric acid and alkali metal chloride and spraying this mixture into a reaction chamber which contains hot gas. The gas is suitably heated to temperatures which are higher than the melting temperature of the phosphate to be prepared. The phosphate is then obtained as molten reaction product. In order to protect the inner wall of the reaction chamber from being corroded by the molten phosphate, the reaction chamber is suitably cooled from the outside with just such an intensity that a protective layer of solid reaction product having a thickness of 2–250 mm., preferably a thickness from 20–50 mm., is formed on the inner wall and remains there. As starting material there may be used not only a solution of alkali metal chloride in dilute aqueous phosphoric acid but also a suspension of finely ground salt in concentrated phosphoric acid. The hot gas into which, according to the invention, the mixture of the reactants is sprayed, contains water vapour since water is evaporated out of the reaction mixture and, moreover, the fuels used for producing the hot gas mostly contain hydrogen.

In carrying out the process according to the invention, it is expedient to increase the partial pressure of the water vapour by introducing additional quantities of water vapour into the reaction chamber. We have found that particularly the preparation of condensed alkali metal phosphates having a ratio of alkali metal, calculated as the oxide, to the phosphorus, calculated as phosphorus pentoxide, which is greater than 1, is promoted thereby.

For carrying out the process according to the invention, there is used an apparatus which contains a reaction chamber filled with hot gas and provided with nozzles for spraying the starting mixture and heating devices for heating the gas. Furthermore, cooling devices are arranged on the outside of the wall of the reaction chamber which enable the varying quantities of heat which act on the inside of the wall to be uniformly dissipated by cooling the wall from the outside.

An apparatus for carrying out the process according to the invention is shown, by way of example, in the accompanying diagrammatic drawing which is in sectional elevation. The mixture of phosphoric acid and alkali metal chloride is sprayed into a reaction chamber 1 through spray nozzles 2 which are designed as one-substance or two-substance nozzles, the number of said nozzles not being limited. The hot gases are suitably produced by flames which reach into the reaction chamber 1. The hot gases of the flames and the atomized droplets may flow counter-currently or co-currently. In the counter-current process, for example, the nozzles 2 are arranged in the upper third of the reaction chamber 1 while gas burners 3 which produce the hot gas are installed in the lower third of the reaction chamber 1 the flames of said gas burners reaching into the reaction chamber 1. The burners are adjusted so that the combustion gases have at least a temperature which is higher than the melting temperature of the phosphate to be produced. A very high reaction, if desired a complete reaction, of the phosphoric acid with the alkali metal chloride is thus obtained. The reaction product is obtained in the form of a molten mass which has a corresponding high temperature.

Due to the spray process, portions of this hot melt deposit on the inner wall of chamber 1 in the form of small droplets which may involve great difficulties since the phosphates which have formed, particularly when they still contain amounts of unreacted alkali metal chloride, have an extremely reactive and destructive effect on every known container material. While the usual materials, such as metals or oxides, ceramic materials, are more or less quickly dissolved by alkali metal phosphate melts, carbon has a reducing effect on alkali metal phosphate melts at temperatures above 600° C., elementary phosphorus being formed thereby. Therefore, the reaction product would, without special precautions, not be contaminated during the reaction proper but to some extent on its further way through the reaction chamber 1. Such contaminations, however, can reliably be avoided if the wall 4 is cooled from the outside to temperatures below the melting temperature of the reaction product. By cooling the wall, there is obtained a sudden solidification of the phosphate melt as soon as it touches the wall 4 in the form of droplets. The inner wall is thus covered with a layer 6 of solid reaction product. This layer is the thicker the more the wall is cooled from the outside. The wall is suitably made from a material which possesses a good thermal conductivity, e.g. from steel or other metal or even graphite. Since even a thin layer protects the wall from being corroded, it suffices that the cooling from the outside is adjusted so that a protective layer is formed which has a thickness of at least 2 mm., preferably a thickness of 20–50 mm. For the purpose of cooling, the outside of the wall 4 may be provided with cooling devices 5 which are installed at certain distances from one another, for example irrigation devices or devices for blowing of air. The cooling resulting from radiation and convection of air may itself suffice in many cases. The phosphate layer formed on the inner wall will always have such a thickness that the heat acting upon this layer from the interior of the reaction chamber 1 and the cooling from the outside are in equilibrium. When this equilibrium is reached and an addition amount of reaction product strikes against this layer of solid phosphate, it no longer becomes solid but flows off and is collected as melt at the bottom 7 of the reaction chamber 1 from where it can be tapped, for example at an outlet 8. In order to ensure that a uniform protective layer is maintained after it has formed, the cooling must be carried out in a manner such that its intensity varies depending upon the varying intensity of the heat acting on the wall 4; thus, for example, the wall near the heating device 3 must be cooled with particular intensity. This is illustrated in the drawing in that the cooling devices 5 near heating device 3 are arranged at short distances from one another while, with the increasing distance from the heating device, they are arranged at greater distances from one another. Furthermore, it was found to be of advantage to provide the wall of chamber 1 with ribs (not shown) which protrude into the phosphate layer, thus avoiding a scaling off of the solid phosphate layer.

If air is used for cooling the outside wall of reaction chamber 1, this air may then advantageously be used as combustion air for the burner 3. A large portion of the quantity of heat dissipated by the cooling is thus recovered. Together with the hydrogen chloride and the water vapour obtained during the reaction, the gas is continuously drawn off from the reaction chamber 1 at an appropriate place, for example, through a central gas suction pipe 9 at the head of the reaction chamber. If desired, the hydrogen chloride may be recovered in any known manner from the exhaust gas and utilized on an industrial scale. As starting substance a suspension of finely ground alkali metal chloride in phosphoric acid or a solution of alkali metal chloride in dilute phosphoric acid may be atomized through the nozzles 2. In order to obtain a complete dissolving of the alkali metal chloride in the phosphoric acid, the latter must be diluted by the addition of water. The concentrations of phosphoric acids in which the quantity of alkali metal chloride required for the preparation of condensed alkali metal phosphates dissolves are within the range of 5 and 20% by weight, depending upon the type of the phosphate to be prepared. An upper limit for the concentration of the phosphoric acid which is used for preparing the suspension is determined by the fact that the suspension must still be in an atomizable state.

The term "condensed alkali metal phosphates" as used herein is intended to means all known alkali metal polyphosphates and alkali metal metaphosphates, such as for example, alkali metal pyrophosphates, alkali metal triphosphates, Kurrol salts, Graham salts, phosphate glasses, acid phosphate glasses or even mixtures of said compounds. In a particularly simple manner there may be prepared, according to the process of the present invention, such condensed alkali metal phosphates in which the ratio of alkali metal oxide to phosphorus pentoxide is small, preferably 1 or smaller than 1; in such cases, one mole or less than one mole of alkali metal chloride is used per one mole of phosphoric acid. Thus, for example, there is obtained from phosphoric acid and potassium chloride in a molar ratio of 1:1 and at a gas temperature of about 850° C. in the reaction chamber a melt of the composition $KPO_3$ according to the equation:

$$H_3PO_4 + KCl \rightarrow KPO_3 + H_2O + HCl$$

Kurrol's potassium salt $(KPO_3)_x$ is formed when this melt is cooled down; this salt melts at about 820° C.

In an analogous manner, phosphoric acid and sodium chloride in a molar ratio of 1:1 yield a melt which is converted into a Graham salt $(NaPO_3)_x$ by chilling; according to the process of the present invention, a temperature of about 650° C. is required in the atomization zone.

The process of the present invention also permits the preparation of condensed alkali metal phosphates of which the alkali metal oxide: phosphorus pentoxide ratio is greater than 1, for example of alkali metal triphosphates ($Me_2O:P_2O_5=1.667$) or of alkali metal pyrophosphates ($Me_2O:P_2O_5=2.00$).

The reaction can be accelerated by the action of additional water vapour. A possible explanation therefor is, perhaps, that the water vapour particularly accelerates the reaction during the second phase of the reaction between alkali metal chloride and phosphoric acid, viz. when the amount of alkali metal chloride exceeds one mole of alkali metal chloride per one mole of phosphoric acid and decomposes with splitting off of hydrogen chloride. When realizing, for example, that the formation of sodium triphosphate from sodium chloride and phosphoric acid takes place in two steps, there is decomposed in the first step one mole of sodium chloride per mole of phosphoric acid as follows:

$$5NaCl + 3H_3PO_4 \rightarrow \tfrac{3}{2}Na_2O \cdot P_2O_5 + 2NaCl + 3HCl + 3H_2O \quad (1)$$

In the second step, the reaction is continued until 5/3 moles of sodium chloride per one mole of phosphoric acid are reacted:

$$\tfrac{3}{2}Na_2O \cdot P_2O_5 + NaCl + H_2O \rightarrow Na_5P_3O_{10} + 2HCl \quad (2)$$

When carrying out the process according to the invention both steps are combined so that the total reaction takes place according to Equation 3, which is the sum of Equations 1 and 2:

$$5NaCl + 3H_3PO_4 \rightarrow Na_5P_3O_{10} + HCl + 2H_2O \quad (3)$$

The second step of the reaction, for example, according to the Equation 2, which takes place with consumption of water, can be accelerated by adding to the reactants a large amount of water, in particular, a larger amount of water than is freed in the first step of the reaction according to Equation 1. Analogous methods may also be developed for all other condensed alkali metal phosphate having an alkali metal oxide: phosphorus pentoxide ratio greater than 1.

A high partial pressure of the water vapour in the hot gas zone can be obtained by introducing water vapour particularly superheated water vapour, or by using, for generating the heat, a fuel gas which is rich in hydrogen.

The technical advantage of the new process is based on the fact that instead of the alkali metal carbonates or alkali metal hydroxides usually used and prepared from chlorides, the chlorides as such may be used for the preparation of condensed alkali metal phosphates. Furthermore, the separated hydrogen chloride can be obtained as a by-product.

The following examples serve to illustrate the invention but they are not intended to limit it thereto.

Example 1

For the preparation of Kurrol's potassium salt $(KPO_3)_x$ potassium chloride was suspended in phosphoric acid. The potassium chloride had previously been ground to particle sizes of the following distribution:

5%>0.06 mm., 25%=0.03 to 0.06 mm., 70%<0.03 mm.

The phosphoric acid used had a $H_3PO_4$ content of 75%, the suspension contained 34.7% phosphorus pentoxide, 36.4% potassium chloride and had a density of 1.715. The molar ratio of potassium chloride to phosphoric acid, in the suspension amounted to 1:1.

The suspension was worked up in an apparatus as shown in the accompanying drawing. 420 litres per hour of this suspension was continuously sprayed through four spray nozzles 2 into chamber 1 which was made from steel and designed as reaction tower. Four gas burners 3 installed at the lower end of the reaction tower and operated with a total of 240 cubic meters per hour of gas (3,900 kcal./cu. m.) and 1,500 cubic meters per hour of air were used for generating the heat. The wall 4 of the reaction tower was cooled by means of air blown on it through annular pipes 5 installed around the reaction tower. Due to the cooling, a layer 6 of solid phosphate, which had a thickness of about 20–50 millimeters, was formed on the vertical walls. The bottom 7 of the reaction tower was cooled with water. A phosphate melt of the composition $K_2O \cdot P_2O_5$ left at the bottom outlet 8 and was obtained in an amount of 380 kilograms per hour; when this melt became solid, Kurrol's potassium polyphosphate $(KPO_3)_x$ was formed. The contamination of this material with unreacted potassium chloride amounted to less than 0.5%. The flame gases, as well as the hydrogen chloride and the water obtained by the reaction, left the reaction tower through pipe 9. In a plant which was connected in series (not shown on the drawing), the phosphate particles which were entrained (about 4% of the yield) were first washed out of these exhaust gases and the hydrogen chloride was then condensed and further worked up to yield hydrochloric acid. When working according to the continuous process described above, there were read off the following temperatures at the five temperature measuring points $t_1$ to $t_5$:

$t_1=850°$ C., $t_2=750°$ C., $t_3=710°$ C., $t_4=580°$ C., $t_5=510°$ C.

Example 2

The Graham salt $(NaPO_3)_x$ was prepared in the same manner as the Kurrol salt, the preparation of which is described in Example 1. Sodium chloride was used instead of potassium chloride. The suspension had the following composition:

38.8% phosphorus pentoxide, 31.9% sodium chloride, molar ratio of sodium chloride to phosphoric acid=1:1, density 1.725. 480 litres per hour of this suspension were sprayed into the reaction tower. The consumption of heating gas amounted to 255 cubic meters per hour. 430 kilograms per hour of anhydrous sodium phosphate melt were obtained. Owing to the low solidification temperature (616° C.) of the sodium phosphate melt, the layer of solid phosphate formed on the vertical walls had, in this case, a thickness of only 20–30 mm. For the same reason, the temperatures in the reaction tower were lower than those of Example 1, viz.:

$t_1=620°$ C., $t_2=580°$ C., $t_3=520°$ C.
$t_4=510°$ C., $t_5=410°$ C.

The melt flowing out of the reaction tower was chilled on cooled steel surfaces. Sodium polyphosphate glass, which is soluble in water and is known as Graham salt, was formed thereby. The analysis showed about 96% of phosphate of high molecular weight, about 3% of trimetaphosphate, less than 1% of orthophosphate and 0.3% of sodium chloride.

Example 3

The sodium polyphosphate melt prepared according to Example 2 was not chilled but slowly cooled in a manner such that the material was maintained for about 30 minutes at a temperature within the range of 500–450° C. Sodium metaphosphate $(NaPO_3)_3$ was formed thereby.

Example 4

A solution of sodium chloride in dilute phosphoric acid was used as starting material for the preparation of sodium polyphosphate. The composition of this solution was as follows:

16.7% by weight phosphoric acid, 16.5% by weight sodium chloride, 66.8% by weight water.

About 420 litres per hour of this solution were sprayed into the reaction tower, the consumption of heating gas amounting to 230–260 cubic meters per hour. 104 kilograms per hour of a phosphate melt were obtained which had the composition $5Na_2O \cdot 3P_2O_5$ and could be converted into sodium tripolyphosphate, $Na_5P_3O_{10}$, by adjusting the temperature during the cooling process. The residual content of chloride amounted to 0.6%.

Example 5

A suspension of finely ground potassium chloride in phosphoric acid was composed as follows:

53.5% by weight potassium chloride, 25.3% by weight phosphorus pentoxide. The molar ratio of potassium chloride to phosphoric acid amounted to 2:1.

This suspension was worked up in the reaction tower described in Example 1 in an amount of 640 kilograms per hour. 240 cubic meters per hour of coke-oven gas were consumed. The salt layer on the wall of the reaction tower had a thickness of 5 to 35 millimeters. The temperatures amounted to:

$t_1=760°$ C., $t_2=680°$ C., $t_3=640°$ C.
$t_4=610°$ C., $t_5=550°$ C.

The composition of the melt flowing out of the reaction tower in an amount of 420 kilograms per hour was as follows: about 45% of potassium pyrophosphate, about 34% of potassium polyphosphates of different molecular weight and about 21% of potassium chloride.

The potassium pyrophosphate can be dissolved out of the mixture obtained by extraction with water. The major part of the potassium polyphosphates of high molecular weight which are obtained as by-product and the unreacted potassium chloride can thus be separated since they are only difficultly soluble in concentrated potassium pyrophosphate solution, and be recycled into the process. The potassium pyrophosphate thus obtained as concentrated aqueous solution can either be used directly in this form or converted in known manner into the anhydrous product.

We claim:

1. Process for the preparation of condensed alkali metal phosphates from phosphoric acid and alkali metal chloride comprising forming a sprayable mixture of said acid and alkali metal chloride in a ratio of said acid and chloride corresponding to the phosphate to be prepared, spraying said mixture of alkali metal chloride and phosphoric acid into a reaction chamber containing hot gas at temperature below 1200° C., distributing cooling agent over the outer wall of the reaction chamber in varying amounts and in such a pattern that the places with greatest heat development in the reaction chamber larger amounts of cooling agent are applied against the chamber from corresponding points of the chamber exterior whereby a uniform protecting layer of alkali metal phosphate is first formed on the inner wall of said reaction chamber, said cooling thereafter controlling the thickness of said layer to maintain the layer at its initial thickness, withdrawing from the bottom of the reaction chamber the additional substantially pure phosphate formed and passing through the chamber, and discharging hydrogen chloride and water vapor from the top of the reaction chamber.

2. Process according to claim 1 which comprises regulating the cooling of the outer wall of the reaction chamber so that on the inner wall of said chamber a uniform protecting layer of solid reaction product is maintained in a thickness of 2 to 250 mm.

3. The process of claim 1 wherein in addition to the starting mixture consisting of alkali metal chloride and phosphoric acid, water vapor is introduced into the reaction chamber.

References Cited in the file of this patent

UNITED STATES PATENTS

| | | |
|---|---|---|
| 2,266,328 | McCullough | Dec. 15, 1941 |
| 2,280,848 | Pole | Apr. 28, 1942 |
| 2,288,418 | Partridge | June 30, 1942 |
| 2,952,531 | Bresee | Sept. 13, 1960 |
| 2,969,280 | Peck | Jan. 24, 1961 |